(12) United States Patent
Hou et al.

(10) Patent No.: US 9,424,613 B2
(45) Date of Patent: Aug. 23, 2016

(54) METHOD, SYSTEM AND APPARATUS FOR LOAD SHAVING OF A POWER GRID AND A TANGIBLE COMPUTER READABLE MEDIUM

(71) Applicant: Accenture Global Services Limited, Dublin (IE)

(72) Inventors: Fang Hou, Beijing (CN); Qin Zhou, Beijing (CN); Zhihui Yang, Beijing (CN); Yuteng Huang, Zhejiang (CN); Yufei Wang, Beijing (CN)

(73) Assignee: Accenture Global Services Limited, Dublin (IE)

( * ) Notice: Subject to any disclaimer, the term of this patent is extended or adjusted under 35 U.S.C. 154(b) by 733 days.

(21) Appl. No.: 13/782,726

(22) Filed: Mar. 1, 2013

(65) Prior Publication Data
US 2014/0074304 A1  Mar. 13, 2014

Related U.S. Application Data

(63) Continuation of application No. PCT/CN2012/081359, filed on Sep. 13, 2012.

(51) Int. Cl.
*G06Q 50/06* (2012.01)
*G05F 5/00* (2006.01)
(Continued)

(52) U.S. Cl.
CPC ...... *G06Q 50/06* (2013.01); *G05F 5/00* (2013.01); *H02J 3/14* (2013.01); *H02J 2003/003* (2013.01); *Y02B 70/3225* (2013.01); *Y04S 10/54* (2013.01); *Y04S 20/222* (2013.01)

(58) Field of Classification Search
USPC ............. 700/297, 286, 276; 705/412
See application file for complete search history.

(56) References Cited

U.S. PATENT DOCUMENTS 7,561,977 B2 * 7/2009 Horst .................. H02J 3/14
700/295
8,019,679 B2 * 9/2011 Bennett ............... G06Q 20/10
705/37

(Continued)

FOREIGN PATENT DOCUMENTS

| CN | 101047663 A | 10/2007 |
| CN | 101316280 A | 12/2008 |
| CN | 201438640 U | 4/2010 |

OTHER PUBLICATIONS

Wang et al, Power System Marginal Cost Curve and its Application, Aug. 3, 1995, ECE Department Chicgo, Illiniois; p. 1321-1328.*

(Continued)

*Primary Examiner* — Kidest Bahta
(74) *Attorney, Agent, or Firm* — Brinks Gilson & Lione

(57) ABSTRACT

The present disclosure provides a system, method and apparatus for load shaving of a power grid, and a tangible computer readable medium. The system may comprise at least one processor; and at least one memory storing computer executable instructions. The at least one memory and computer executable instructions may be configured to, with the at least one processor, cause the system to profile behavior data for power customers to divide the power customers into at least one group; define, based on usage characteristic of each of the at least one group, a possible load shaving strategy for each of the at least one group; and perform load shaving analysis at least under constraint of the possible load shaving strategy for each of the at least one group, to provide a recommended load shaving strategy for each of the power customers.

30 Claims, 11 Drawing Sheets

(51) Int. Cl.
 *H02J 3/14* (2006.01)
 *H02J 3/00* (2006.01)

(56) References Cited

U.S. PATENT DOCUMENTS

| | | | | |
|---|---|---|---|---|
| 8,078,330 | B2* | 12/2011 | Brickfield | H02J 3/008 700/286 |
| 8,396,606 | B2* | 3/2013 | Forbes, Jr. | G06Q 10/00 700/22 |
| 2005/0280528 | A1 | 12/2005 | Olsen et al. | |
| 2006/0001414 | A1* | 1/2006 | Angerame | G01D 4/002 324/103 R |
| 2011/0095017 | A1* | 4/2011 | Steurer | H02J 3/14 219/493 |
| 2011/0264291 | A1* | 10/2011 | Le Roux | G06Q 10/06 700/291 |
| 2013/0103222 | A1* | 4/2013 | Watson | G06Q 50/06 700/295 |

OTHER PUBLICATIONS

Malone, Electrical Load Manafement, Oct. 24, 2010, Stanford University, pp. 1-3.*
Luo et al., Demand side Mangement in a highly Decentralized nergy Future. Sep. 2010, Univ. of Strathclyde, p. 1-6.*
AboGaleela et al., A Two level Optimal DSM Load shifting formilation using Genetics Algorithm Case Study : Residential Loads, Jul. 2012, Cairo University,p. 1-7.*
International Search Report and Written Opinion, dated Jun. 27, 2013, pp. 1-7, issued in International Patent Application No. PCT/CN2012/081359.

* cited by examiner

METHOD, SYSTEM AND APPARATUS FOR LOAD SHAVING OF A POWER GRID AND A TANGIBLE COMPUTER READABLE MEDIUM

RELATED APPLICATIONS

This application is a continuation of Patent Cooperation Treaty (PCT) international application Serial No. PCT/CN2012/081359, filed Sep. 13, 2012, which designates the United States, the entirety of which is hereby incorporated by reference herein.

TECHNICAL FIELD

The present disclosure relates to the field of power grid technology and more particularly to a method, system, and apparatus for load shaving of a power grid, and a tangible computer readable medium.

BACKGROUND OF THE INVENTION

Various industries have networks associated with them. One such industry is the utility industry that manages a power grid. The power grid may include one or all of the following: electricity generation, electric power transmission, and electricity distribution. Electricity may be generated using generating stations, such as a coal fire power plant, a nuclear power plant, etc. For efficiency purposes, the generated electrical power is stepped up to a very high voltage (such as, for example, 345K Volts) and transmitted over transmission lines. The transmission lines may transmit the power long distances, such as across state lines or across international boundaries, until it reaches its wholesale customer, which may be a company that owns the local distribution network. The transmission lines may terminate at a transmission substation, which may step down the very high voltage to an intermediate voltage (such as, for ex ample, 138K Volts). From a transmission substation, smaller transmission lines (such as, for example, sub-transmission lines) transmit the intermediate voltage to distribution substations. At the distribution substations, the intermediate voltage may be again stepped down to a "medium voltage" (such as, for example, from 4K Volts to 23K Volts). One or more feeder circuits may emanate from the distribution substations. For example, four to tens of feeder circuits may emanate from the distribution substation. The feeder circuit is a 3-phase circuit comprising 4 wires (three wires for each of the 3 phases and one wire for neutral). Feeder circuits may be routed either above ground (on poles) or underground. The voltage on the feeder circuits may be tapped off periodically using distribution transformers, which step down the voltage from "medium voltage" to the consumer voltage (such as, for example, 120V). The consumer voltage may then be used by the consumers.

For consumers, steady and sufficient power supplies are important. Generally, the steady power can be produced with a typical coal, gas, or nuclear plant if only the capacity of the generator is enough and a steady and sufficient supply of fuel is ensured. However, consumers' power demand is not steady and the demand usually is higher during daytime than during nighttime. That is to say, the load of the power grid has a peak which generally occurs at daytime and a valley which often occurs at nighttime, as illustrated in FIG. 1A. Therefore, the load of the power grid is highly volatile.

To tackle these problems, one of emerging approaches is to manage the demand to match the limited supply. A typical solution of load management is peak load shaving (hereinafter referred to load shaving in short), which is to shave the load by reducing the peak demand and increasing the valley demand or moving some of the demand from the peak load periods to the valley load periods. The load shaving can include load clipping and load shifting. As illustrated in FIG. 1B, the load clipping refers to a load management measure which includes clipping the peak load by, for example, turning off some electrical equipment. The peak shifting refers to a load management measure which includes shifting the peak load to other times while keeping the load curve intact by, for example, making some electrical equipment operate at off-peak hours (for instance, advancing or postponing operations of a manufactory several hour to avoid peak hours). The valley filling refers to arranging some loads to the valley hours so as to fill the load valley.

With a high economic growth, the power demand is constantly increasing but the energy consumption is not optimized. This causes rapid increase of energy consumption and even greater increase of peak consumption, which in turn results in a peak load growth greater than the base load growth. That is, there is a greater difference between the peak load and the valley load. The utility has to either depend on the increasingly more expensive power supply which will result in a very low return on investment, or deny service to customers which would badly impact customer experience and decrease customer satisfaction.

Therefore, the growth of peak-valley difference will induce many problems such as a lower asset usage, a higher asset renew rate, a lower return of investment ("ROI"), a higher supply pressure, a lower supply reliability, lower customer satisfaction, revenue loss during blackout, load shedding, etc. Moreover, it may increase the system operation balancing difficulties. Accordingly, there may be a need to better manage the load of a power grid so as to balance load.

SUMMARY OF THE INVENTION

According to an aspect of the present disclosure, there is provided a system for load shaving of a power grid. The system may comprise at least one processor; and at least one memory storing computer executable instructions. The at least one memory and the computer executable instructions may be configured to, with the at least one processor, cause the system to profile behavior data for power customers to divide the power customers into at least one group; define, based on usage characteristic of each of the at least one group, a possible load shaving strategy for each of the at least one group; and perform load shaving analysis at least under constraint of the possible load shaving strategy for each of the at least one group, to provide a recommended load shaving strategy for each of the power customers.

According to another aspect of the present disclosure, there is provided a method of load shaving of a power grid. The method may comprise: profiling, using a processor, behavior data for power customers to divide the power customers into at least one group; defining, using a processor, based on the usage characteristic of each of the at least one group, a possible load shaving strategy for each of the at least one group; and performing, using a processor, load shaving analysis at least under constraint of the possible load shaving strategy for each of the at least one group, to provide a recommended load shaving strategy for each of the power customers.

According to a further aspect of the present disclosure, there is provided an apparatus for load shaving of a power grid. The apparatus may comprise means for profiling behavior data for power customers to divide the power customers into at least one group; means for defining, based on the usage characteristic of each of the at least one group, a possible load shaving strategy for each of the at least one group; and means for performing load shaving analysis at least under constraint of the possible load shaving strategy for each of the at least one group, to provide a recommended load shaving strategy for each of the power customers.

According to a yet aspect of the present disclosure, there is provided an apparatus for load shaving of a power grid. The apparatus may comprise profiling module configured to profile behavior data for power customers to divide the power customers into at least one group; defining module configured to define, based on the usage characteristic of each of the at least one group, a possible load shaving strategy for each of the at least one group; and analysis module configured to perform load shaving analysis at least under constraint of the possible load shaving strategy for each of the at least one group, to provide a recommended load shaving strategy for each of the power customers.

According to a yet further aspect of the present disclosure, there is provided a tangible computer-readable medium having a plurality of instructions executable by a processor to manage loads of a power grid. The tangible computer-readable medium may comprise instructions configured to perform steps of the method according to the aspect of present disclosure.

Embodiments of the present disclosure provide a recommended load shaving strategy for certain of power customers, which is consistent with the behavior characteristic of customers and at the same time load shaving optimization may be achieved. The optimization objective may be any one or more objectives of supply reliability, economic operation, and customer satisfaction. Therefore, the present disclosure has provided a solution especially for load shaving in utilities with serious supply short or significant peak-valley load difference. Besides, asset usage, and ROI can be improved and the supply pressure can be alleviated.

BRIEF DESCRIPTION OF THE DRAWINGS

The above and other features of the present disclosure will become more apparent through detailed explanation on the embodiments as illustrated in the embodiments with reference to the accompanying drawings wherein like reference numbers represent same or similar components throughout the accompanying drawings of the present disclosure, wherein:

FIGS. 3A and 3B schematically illustrate diagrams of profiling the behavior data of power customers according to an example embodiment of the present disclosure, wherein FIG. 3A illustrates a diagram of customer profiles for a single customer, and FIG. 3B illustrates a diagram of groups into which the customers are divided in terms of power usage shape;

DETAILED DESCRIPTION OF THE INVENTION

Hereinafter, embodiments of the present disclosure will be described with reference to the accompanying drawings. In the following description, numerous specific details are set forth in order to provide a thorough understanding of the embodiments. However, it is apparent to the skilled in the art that implementation of the present disclosure may not have these details and the present disclosure is not limited to the particular embodiments as introduced here. On the contrary, any arbitrary combination of the following features and elements may be considered to implement and practice the present disclosure, regardless of whether they involve different embodiments. Thus, the following aspects, features and embodiments are only for illustrative purposes, and should not be understood as elements or limitations of the appended claims, unless otherwise explicitly specified in the claims. Additionally, in some instances, well known methods and structures have not been described in detail so as not to unnecessarily obscure the embodiments of the present disclosure.

The embodiments of the present disclosure are intended to reduce the peak load growth at a low impact while keeping energy growth through the load shaving approaches. Therefore, to tackle this problem, it is important to find customers who are suitable candidates for the load shifting and load clipping respectively and what time and how much to clip or shift for each of candidates. In view of that, the present inventor proposes a solution for load shaving which will be described hereinafter at length.

Figure 1A:
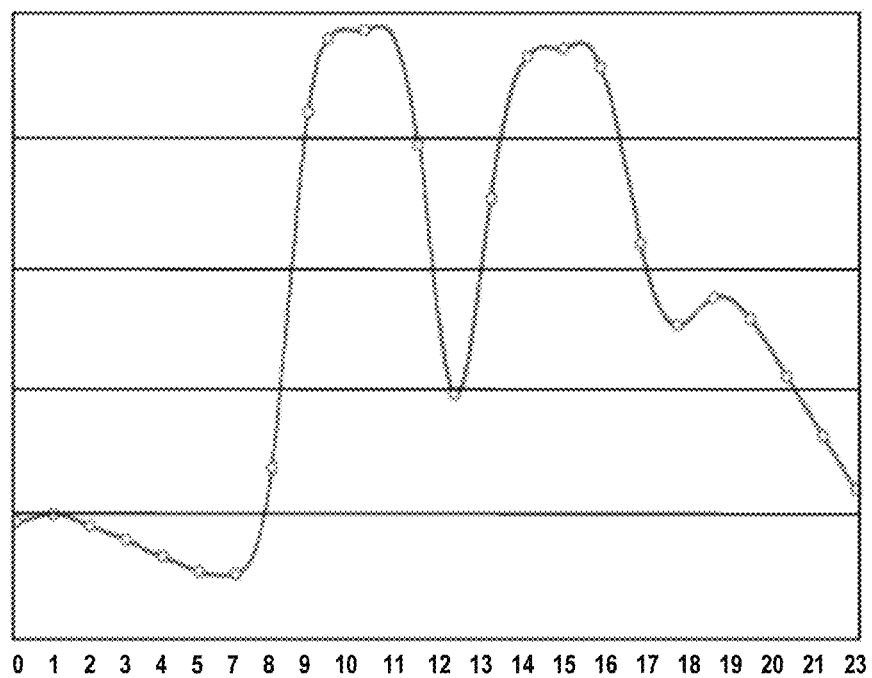
FIG. 1A schematically illustrates a diagram of load curve of a power grid.
Figure 1B:
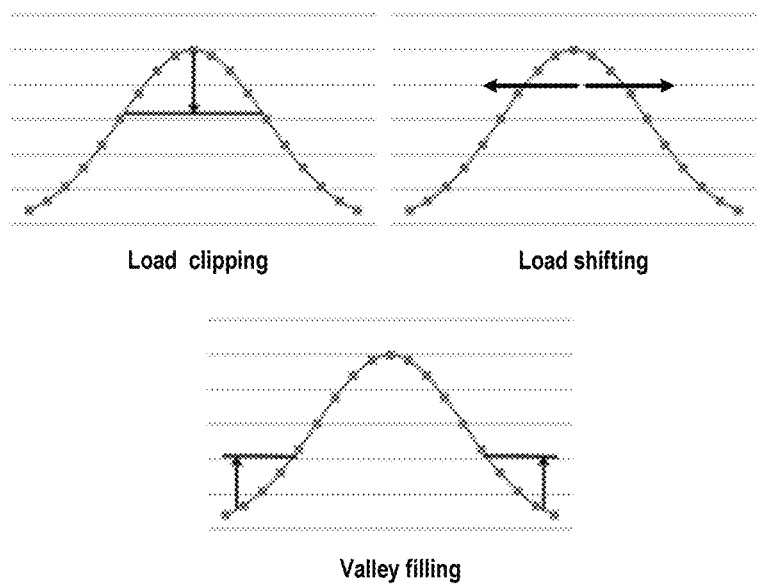
FIG. 1B schematically illustrates typical approaches of load management.
Figure 2:
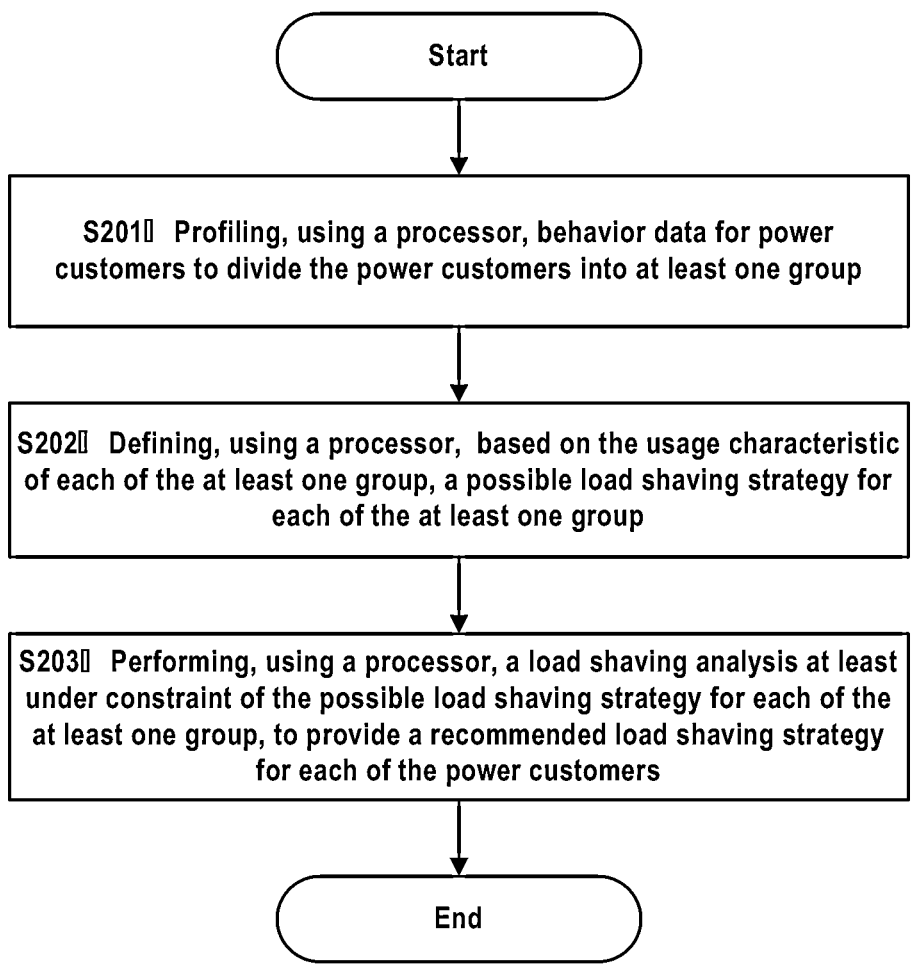
FIG. 2 schematically illustrates a flow chart of a method for load shaving of a power grid according to an example embodiment of the present disclosure.

Reference is first made to FIG. 2 to describe the method of load shaving of a power grid according to an example embodiment of the present disclosure.

As illustrated in FIG. 2, at step S201, behavior data for power customers is profiled to divide the power customers into at least one group using a processor.

The behavior data refer to those describing the behavior of the power consumption of the customers, especially time series data, e.g., the load curve or power consumption amount of customers during each time interval. These data can be acquired from AMI (Advanced Metering Infrastructure), or from a database storing AMI data. It is known that AMI are systems that measure, collect, and analyze energy usage, and communicate with metering devices such as electricity meters, gas meters, heat meters, and water meters, either on request or on a schedule. The network between the measurement devices and business systems allows collection and distribution of information to customers, suppliers, utility companies, service providers and other parties. Thus, the behavior data can be easily obtained from the AMI. However, it can be appreciated that it is also possible to obtain the behavior data from any other database or data platform.

Additionally, other data such as attributes data or records from CRM can also be acquired. The example of data that can be acquired according to an example embodiment of the present disclosure is given as below only for a purpose of illustration.

TABLE 1

Time Series Data
Time Series Data (e.g. per min or 15 min)

Load curve
Energy consumption amount (hourly, daily, weekly and monthly)
...

TABLE 2

Attributes Data
Demographics Data (Attributes Data)

Location
Business categories
Supply priority level
...

TABLE 3

Other Customer Data
Other Customer Data

Credit record
Tariff data
...

Therefore, as given in table 1, the behavior data for power customers can comprise time series data, and particularly, the time series data can further comprise one or more of load curves and energy consumption amount during each time interval, for example, hourly, daily, weekly, monthly, etc. It can also acquire attributes data such as location of the customer, the business category of the customer, and the supply priority level of the customer. Additionally, it can acquire other customer data such as credit record, tariff data. It is possible to use the attributes data and the other customer data to facilitate definition of the load shaving strategy.

Preferably, the customers can be large customers, who have a heavy peak demand, for example higher than 50 KVA, 100 KVA, etc. The large customers consume most of the energy and thus their behavior has a bigger impact on the power grid. Besides, they are relatively better equipped with measuring and control devices, and many of them adopt new technologies such as AMI, which will provide much better visibility into customers' behavior, value on a continuous basis. Therefore, in an embodiment of the present disclosure, they may be more suitable candidates for load management.

After data transition, cleaning and formatting, it can perform further data exploration. The behavior data will be taken as inputs of data profiling. The behavior data can be profiled by using known data analysis techniques such as, for example, data mining and clustering. The data analysis techniques are known in the art and thus will not be detailed herein for a purpose of simplification. Through the data analysis, customers load profiles and representative load curves can be obtained, and the profiles can be further divided into a plurality of groups, which are schematically illustrated in FIGS. 3A and 3B.

Figure 3A:
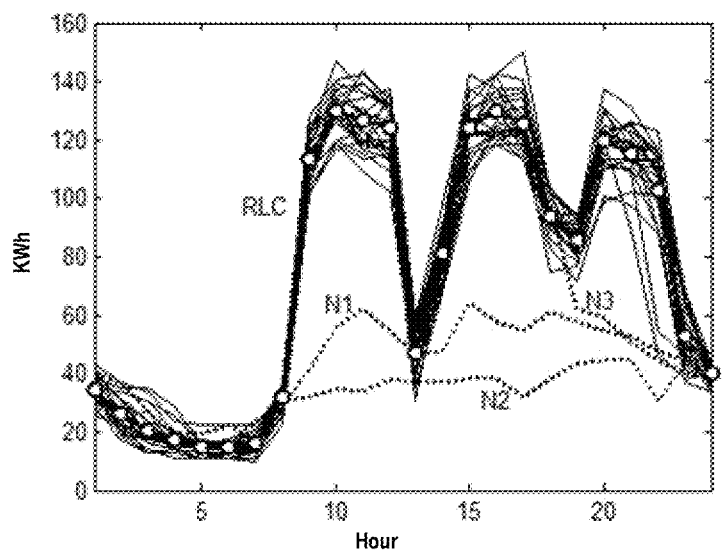
Figure 3B:
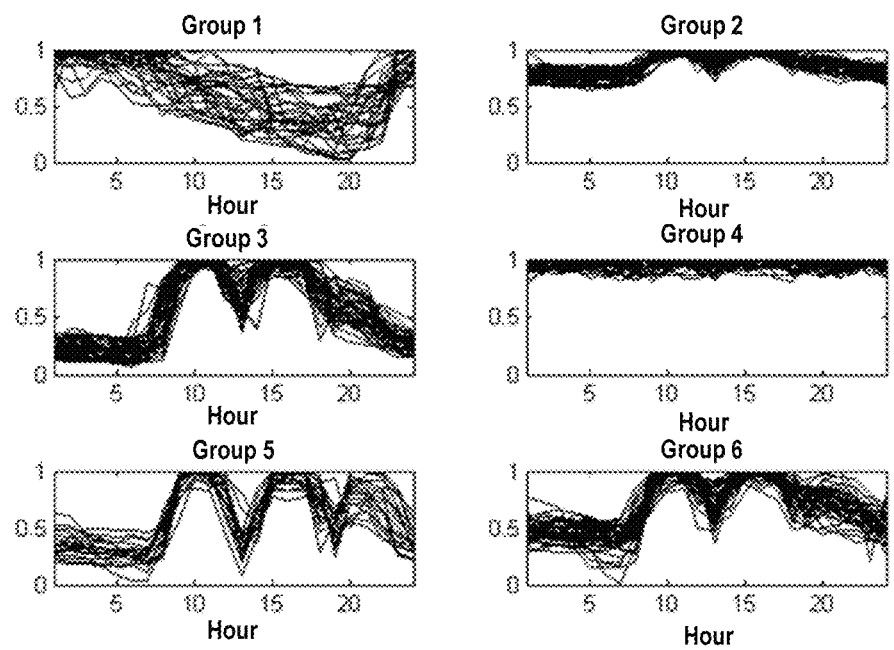

As shown in FIG. 3A, for a single customer, the behavior data can provide many customer profiles. The profiles are different for different days. As an example, the profile for a workday is quite different from that for a weekend and the profiles for workdays are somewhat different from each other. Sometimes, there might also be some special profiles which are quite different from others. Thus, it is necessary to obtain a representative load curve for the customer.

An approach is to obtain a representative load curve by simply selecting one of the plurality of profiles, or by averaging, weighted averaging the plurality of profiles, or any other suitable manners. It is also preferable that singular data or profiles can be excluded in advance. In such way, the representative load curve for the customer can be obtained as illustrated by a curve composed of hollow arrows and lines in FIG. 3A. The customers can be divided into at least one group based on their representative load curves. As schematically illustrated in FIG. 3B, the customers with similar representative load curves are divided into one and the same group. Thus, it can obtain at least one group and FIG. 3B illustrates six groups.

Figure 3C:
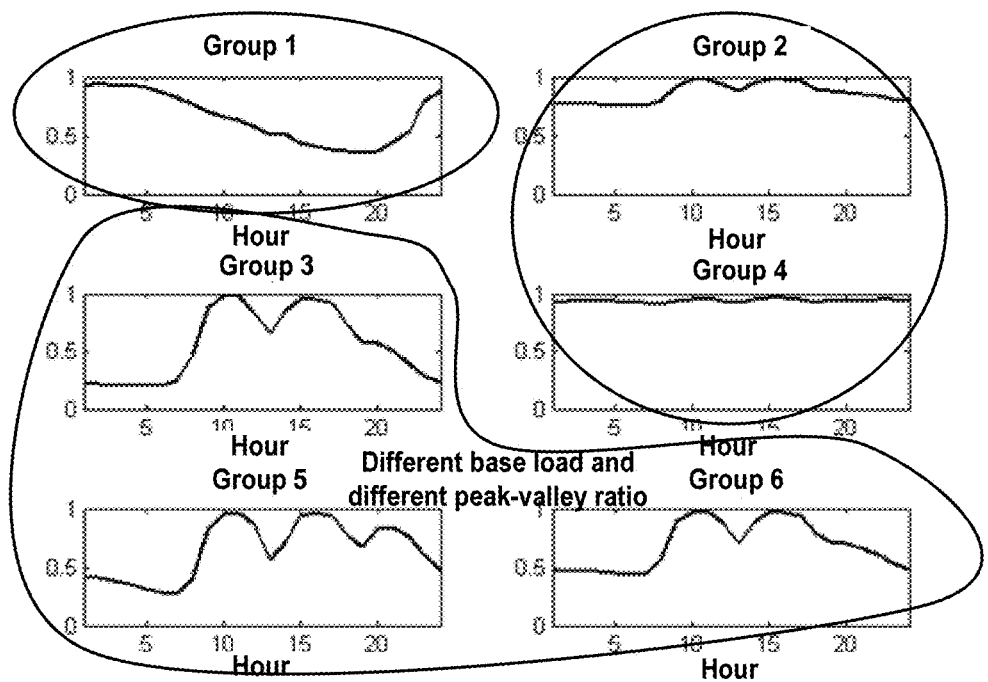
FIG. 3C schematically illustrates a diagram of representative load curves of the groups of power consumers according to an example embodiment of the present disclosure.

Besides, for clarity, there are schematically illustrated representative load curves of the groups of power consumers according to an example embodiment of the present disclosure in FIG. 3C. As illustrated in FIG. 3C, the power customers have been divided into six groups, i.e., groups 1 to 6. Groups 1 belongs to customers of reverse type, which consume less power during system peak hours and more power during system valley hours and thus have reverse peak loads comparing to the system load. Group 2 and 4 belongs to customers of smooth type, which have smooth loads and have no obvious peak or valley in their load curves; however, as illustrated in FIG. 3C, the load curve of group 2 fluctuates somewhat compared to that of group 4. Groups 3, 5, and 6 belong to customers of volatile type, i.e., customers with highly volatile loads; their load curves have a huge peak-valley difference and the peak and valley thereof are concurrent with the system peak and valley. However, as is clear from FIG. 3C, customers in groups 3, 5 and 6 have different base loads.

Figure 3D:
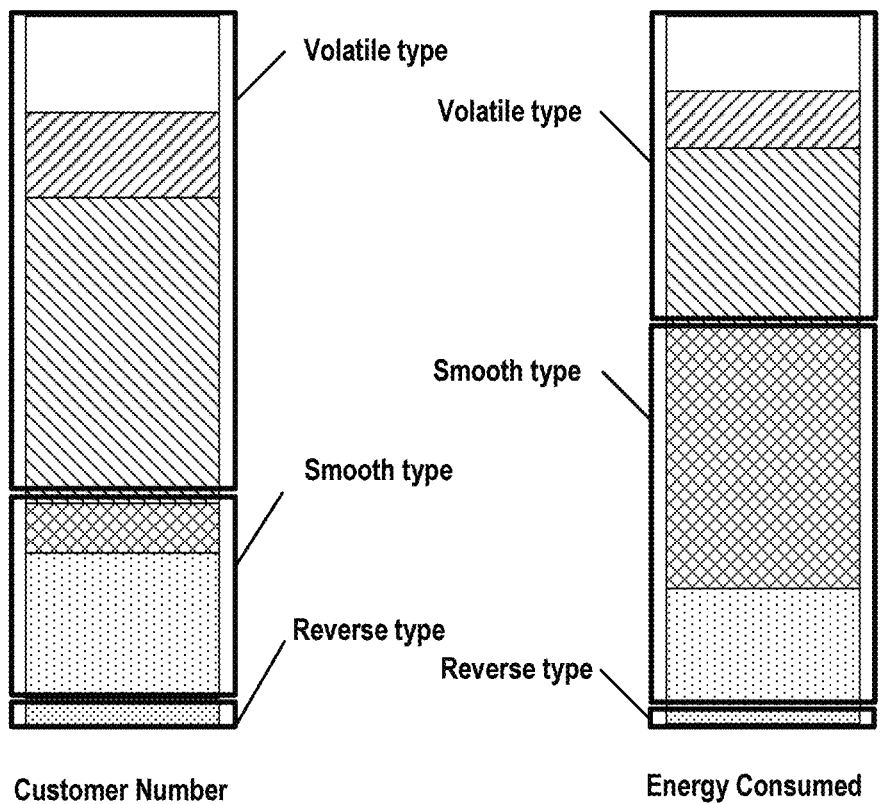
FIG. 3D schematically illustrates a diagram of customer distribution in term of the number of customers and energy consumption according to an example embodiment of the present disclosure.

FIG. 3D shows customer distribution in term of the number of customers and energy consumption according to an example embodiment of the present disclosure. As illustrated, the customers of volatile type cover nearly 70% customers in number; the customers of smooth type cover more than 25% customer; and the customers of reverser type covers only less than 5%. However, the customer of smooth type consume most (nearly a half) of energy; the customers of volatile type consume somewhat less energy; and the customers of reverser type consume least energy. For each group, further operations will be made in a subsequent step.

Back to FIG. 2, a possible load shaving strategy for each of the at least one group is defined based on the usage characteristic of each of the at least one group using a processor at step S202.

Particularly, the strategy for each segment is defined according to the usage pattern comparing with the system load pattern. During strategy definition, there can be many indices to be considered, and the key ones can comprise peak-valley ratio which reflects the peak-valley difference and correlation coefficient between the group load curve with system load curve which reflect the correlation between the two curves.

The peak-valley ratio PVR can be represented as:

$$PVR = (P\max - P\min)/P\max \qquad \text{(Equation 1)}$$

wherein Pmax denotes the maximum load; and Pmin denotes the minimum load.

The correlation coefficient Corr can be represented as $$\text{Corr} = \frac{\text{COV}(P_i \cdot P')}{\sqrt{D(P_i)}\sqrt{D(P')}} = \frac{\sum_{t=1}^{T}[P(i,t) - P_{avg}(i)][P'(t) - P'_{avg}]}{\sqrt{\sum_{t=1}^{T}[P(i,t) - P_{avg}(i)]^2}\sqrt{\sum_{t=1}^{T}[P'(t) - P'_{avg}]^2}}$$ (Equation 2)

wherein, $P_i$ denotes the average load curve of ith group; P' denotes the system load curve; P(i,t) denotes representative (e.g. average) load of ith group at time interval t, $P_{avg}(i)$ denotes average load of ith group at all intervals, P'(t) denotes the system load at time interval t, and $P'_{avg}$ denotes the average system load at all of the time intervals.

In an embodiment of the present disclosure, the strategy definition can comprise determining a peak-valley ratio for each of the at least one group; determining a correlation coefficient between a load curve for each of the at least one group and a system load curve; and determining the possible load shaving strategy for each of the at least one group based on at least the peak-valley ratio and the correlation coefficient.

In the present disclosure, the possible load shaving strategy for each of the at least one group can comprise at least one of: load shifting; load clipping; load shifting and load clipping; and not involving load shaving. The possible load shaving strategy can be determined based on the values of the peak-valley ratio PVR and the correlation coefficient Corr.

Particularly, if the correlation coefficient Corr is more than or equal to a predefined value k and the peak-valley ratio PVR is lower than a first predefined threshold L1, the customers in the group are not suitable for load shifting, that is to say, their possible load shaving strategy can be determined as load clipping; if the correlation coefficient Corr is more than or equal to the predefined value k and the peak-valley ratio PVR is higher than or equal to the first predefined threshold L1, the consumers in the group are suitable for both load clipping and load shifting, and thus their possible load shaving strategy can be determined as load shifting and load clipping; if the correlation coefficient Corr is less than the predefined value k and the peak-valley ratio PVR is higher than a second predefined threshold L2, the consumers in the group are not suitable for either load clipping or load shifting, and thus their possible load shaving strategy can be determined as not involving the load shaving; and if the correlation coefficient Corr is less than the predefined value k and the peak-valley ratio PVR is lower than or equal to the second predefined threshold L2, the customers in this group are only suitable for load clipping and thus their possible load shaving strategy can be determined as load clipping. The k is a parameter predefined based on experience or through experiment, which can be, for example, zero. The threshold L1 is small than the threshold L2, they can also be predefined based on experience or through experiments.

Additionally, it can also exclude some consumers from load shaving if they have a special attribute. For example, it can check the supply priority of the customers; if a customer has a high supply priority or the consumer is a public service customer, which means that it should give a first rank to ensure the power supply of the consumer, it is determined that the customer is not involving the load shaving.

For example, for customers of reverse type in group 1 as illustrated in FIG. 3C, it can be determined that they are not involving load shaving; for customers of smooth type in groups 2 and 4, it can determine the possible load shaving strategy as load clipping; for customer of volatile type in groups 3, 5 and 6, it can determine the possible load shaving strategy as both load clipping and load shifting.

Next, at step S203, load shaving analysis is performed at least under constraint of the possible load shaving strategy for each of the at least one group, to provide a recommended load shaving strategy for each of the power customers by using a processor.

In this step, load shaving analysis will be performed. The possible load shaving strategy for each of the at least one group determined in step S202 can be used as one of the constraints of the load shaving optimization analysis.

The load shaving analysis can have any suitable objectives. In an embodiment of the present disclosure, the load shaving analysis can have one or more of an economic operation objective, a supply reliability objective and a customer satisfaction objective. In an preferable embodiment of the present disclosure, the optimization objective can be presented as follows:

Objects: Min $\text{COST}_I + \text{COST}_{II} + \text{COST}_{III}$ (Equation 3)

wherein
$\text{COST}_I$ denotes an economic operation cost for the utility, i.e., the revenue loss after taking the load shaving strategy;
$\text{COST}_{II}$ denotes a supply reliability cost for the utility, i.e., the outage loss when power supply could not match the demand; and
$\text{COST}_{III}$ denotes a customer satisfaction cost, i.e., the compensation fee paid by the utility for customer satisfaction reduction.

As an example, the revenue loss $\text{COST}_I$ can be represented as $$\text{COST}_I = \sum_{i=1}^{N1}\sum_{t=1}^{T} C_i(t)[\Delta P^i_{clipping}(t) + \Delta P^i_{shifting}(t)] + \sum_{j=1}^{N2}\sum_{t=1}^{T} C_j(t)\Delta P^j_{2clipping}(t)$$ (Equation 4)

wherein
$N_1$ denotes the number of customers who could participate either in load clipping or load shifting;
$N_2$ denotes the number of customers who could participate only in load clipping;
i denotes an index of the customers in the $N_1$ customers;
j denotes an index of the customers in the $N_2$ customers;
t denotes an index of time intervals;
T denotes the number of time intervals;
$C_i(t)$ denotes power tariff of the ith customer in the $N_1$ customers at time interval t;
$C_j(t)$ denotes power tariff of the jth customer in the $N_2$ customers at time interval t;
$\Delta P_{clipping}^i(t)$ denotes clipped power of the ith customer in the $N_1$ customers at time interval t;
$\Delta P_{shifting}^i(t)$ denotes shifted power of the ith customer in the $N_1$ customers at time interval t; and
$\Delta P_{2clipping}^j(t)$ denotes clipped power of the jth customer in the $N_2$ customers at time interval t.

As an example, the outage loss $COST_{II}$ can be represented as $$COST_{II} = \sum_{t=1}^{T} EENS(t) \cdot IEAR(t) = \sum_{t=1}^{T} K_{IEAR}(t) \cdot EENS(t) \quad \text{(Equation 5)}$$

wherein $K_{IEAR}(t)$ denotes Interrupted Energy Assessment Rate at time interval t; and EENS(t) denotes Expected Energy Not Supplied at time interval t, which is the difference between supply power and demand power at time interval t. In an embodiment of the present disclosure, EENS(t) can be represented as $$EENS(t) = \begin{cases} X(t), & X(t) \geq 0 \\ 0, & X(t) < 0 \end{cases}$$

$$X(t) = \Delta P_{gap}(t) - \sum_{i=1}^{N1}[\Delta P^i_{clipping}(t) + \Delta P^i_{shifting}(t)] - \sum_{j=1}^{N2}\Delta P^j_{2clipping}(t)$$

wherein $\Delta P_{gap}(t)$ denotes the amount of power shortage of the total distribution system at each time interval t.

Additionally, as an example, the customer satisfaction cost COSTIII can be represented as $$CosT_{III} = \sum_{i=1}^{N1} C_s^i(1-S_i) + \sum_{j=1}^{N2} C_s^j(1-S_j) \quad \text{(Equation 6)}$$

$$S_i = 1 - \frac{\sum_{t=1}^{T}\Delta P^i_{clippling}(t)}{\sum_{t=1}^{T}P^i(t)},$$

$$S_j = 1 - \frac{\sum_{t=1}^{T}\Delta P^j_{2clippling}(t)}{\sum_{t=1}^{T}P^j(t)}$$

wherein $S_i$ is the satisfaction rate of the ith customer in the $N_1$ customers after taking load shaving strategy;

$S_j$ is the satisfaction rate of the jth customer in the $N_2$ customers after taking load shaving strategy;

$C_s^i$ is the compensation tariff for ith customer in the $N_1$ customers;

$C_s^j$ is the compensation tariff for jth customer in the $N_2$ customers;

$P^i(t)$ denotes original power of the ith customer in the $N_1$ customers at time interval t; and $P^j(t)$ denotes original power of the jth customer in the $N_2$ customers at time interval t.

In addition to the possible load shaving strategy for each of the at least one group, the shaving analysis can further have other constraints. For a purpose of illustration, several exemplary constraints are provided as follows:

I. Strategy Enrollment Constraint

Each customer could only be involved in one load shaving strategy, either load clipping or load shaving, thus for the ith customer in the $N_1$ customers and the jth customer in the $N_2$ customers $$U_{shifting}^i + U_{clipping}^i \leq 1, i \in N_1$$

$$U_{2clipping}^j \leq 1, j \in N_2 \quad \text{(Equation 7)}$$

wherein $U_{shifting}^i$ denotes the enrollment state of the ith customer in the $N_1$ customers of load shifting strategy;

$U_{clipping}^i$ denotes the enrollment state of the ith customer in the $N_1$ customers of load clipping strategy; and $U_{2clipping}^j$ denotes the enrollment state of the jth customer in the $N_2$ customers of load clipping strategy.

Each of $U_{shifting}^i$, $U_{clipping}^i$ and $U_{2clipping}^j$ is binary, zero representing not involving respective load shaving strategy and one representing involving respective load shaving strategy.

II. Load Clipping Amount Constraint

The load after clipped could not exceed the original maximum and minimum load $$P^i_{min} \leq P^i(t) - \Delta P_{clipping}^i(t) \leq P^i_{max}, i \in N_1$$

$$P^j_{min} \leq P^j(t) - \Delta P_{2clipping}^j(t) \leq P^j_{max}, j \in N_2 \quad \text{(Equation 8)}$$

wherein $P^i_{max}$, maximum load of the ith customer in the N1 customers (kW);

$P^i_{min}$, minimum load of the ith customer in the N1 customers (kW);

$P^j_{max}$, maximum load of the jth customer in the N2 customers (kW); and $P^j_{min}$, minimum load of the jth customer in the N2 customers (kW).

For each volatile load customer, its clipped load at each time interval t should not exceed its maximum load change rate.

$$-U^i_{clipping} \cdot \Delta Pu_{max}(m) \cdot P^i_{max} \leq \Delta P_{clipping}^i(t) \leq U^i_{clipping} \cdot \Delta Pu_{max}(m) \cdot P^i_{max} \quad \text{(Equation 9)}$$

wherein $\Delta Pu_{max}(m)$ denotes maximum load change rate of the volatile group m in unit value.

For the ith customer, when it belongs to group m, the maximum load change rate of group m can be used to represent its maximum load change rate.

Besides, for each smooth load customer, its clipping load at each time interval should not exceed its maximum tolerant clipping percentage; thus, $$-K_p \cdot P^i_{max} \leq \Delta P_{2clipping}^i(t) \leq K_p \cdot P^i_{max} \quad \text{(Equation 10)}$$

wherein $K_p$ denotes maximum clipping percentage for smooth load customers.

III. Load Shifting Amount Constraint

For each customer, its shifting load at each time interval t should equal to the difference between the original load and the load after shifted at the same shifting hour. That is to say, $$\Delta P_{shifting}^i(t) = U^i_{shifting}[P^i(t) - P^i(t+k_i)], K_i \in \{-K, K\} \quad \text{(Equation 11)}$$

wherein $K_i$ denotes the shifted number of time intervals of the ith customer; K is the predefined maximum shifting number of time intervals for load shifting strategy, which means that, for customer involved in load shifting, they could only shifting their load forward or backward within the range of ±K time intervals.

Additionally, other constrains can also be added which will be described hereinafter.

IV. Daily Consumption Constrains

For each customer participating in load clipping, their daily power consumption could not increase, that is to say, $$\sum_{t=1}^{T} \Delta P_{clipping}^{i}(t) \geq 0, i \in N_1 \quad \text{(Equation 12)}$$

$$\sum_{t=1}^{T} \Delta P_{2clipping}^{j}(t) \geq 0, j \in N_2$$

V. System Load Increasing/Decreasing Constrain for Different Time Period

Twenty-four hours for a day can be divided into three kinds of power system time period, which are Peak Period, Valley Period and Shoulder Period. For the whole power system, Load of peak period could not be increased, while load of valley period could not be decreased. Thus, it can obtain $$\sum_{i=1}^{N_1} (\Delta P_{clipping}^{i}(t) + \Delta P_{shifting}^{i}(t)) \geq 0, \quad \text{(Equation 13)}$$

$$t \in \text{peak period}, i \in N_1$$

$$\sum_{i=1}^{N_1} (\Delta P_{clipping}^{i}(t) + \Delta P_{shifting}^{i}(t)) \leq 0,$$

$$t \in \text{valley period}, i \in N_1$$

$$\sum_{j=1}^{N_2} \Delta P_{2clipping}^{j}(t) \geq 0, t \in \text{peak period}, j \in N_2$$

$$\sum_{j=1}^{N_2} \Delta P_{2clipping}^{j}(t) \leq 0, t \in \text{valley period}, j \in N_2$$

VI. System Reserve Constraint

For the system load, its increased load amount at each time interval should be less than the spinning reserve of the whole system that could afford.

$$\sum_{i=1}^{N1} [\Delta P_{clipping}^{i}(t) + \Delta P_{shifting}^{i}(t)] + \sum_{j=1}^{N2} \Delta P_{2clipping}^{j}(t) \geq \quad \text{(Equation 14)}$$

$$-\beta_{up} * P^{system}(t)$$

wherein $\beta_{up}$ denotes spinning reserve percentage of the whole system; and $P^{system}$ denotes the original forecasted system load of each time interval.

Additionally, the optimization model as given in Equation 3 is a nonlinear mixed model and it is know that such a model does not easy escape from local optimal solution. To easily obtain global optimal solution, the model can be further linearized.

First, the load shifting amount constraint as given in Equation 11 can be linearized by using a binary variable $y_j$ wherein $y_j=1$, if the load is shifted j hours; otherwise $y_j=0$. Thus, the equation 11 can be linearized as follows:

$$\Delta P_{shifting}^{i}(t) = U_{shifting}^{i} \cdot P^{i}(t) - \sum_{k=-K}^{K} y_k P^{i}(t+k)] \quad \text{(Equation 15)}$$

$$y_k = \{0, 1\}$$

$$\sum_{k=-K}^{K} y_k = U_{shifting}^{i}$$

Next, the EENS(t) in outage loss $COST_{II}$ as given in Equation 5 can be linearized by means of piecewise linearization approach, which will use, for example, two continuous variables $ë_1$ and $ë_2$ and two binary variables $x_1, x_2$. Specifically, EENS(t) is a section function as shown in the following Equation 16, $$EENS(t) = \begin{cases} X(t), & X(t) \geq 0 \\ 0, & X(t) < 0 \end{cases} \quad \text{(Equation 16)}$$

$$X(t) = \Delta P_{gap}(t) -$$

$$\sum_{i=1}^{N1} [\Delta P_{clipping}^{i}(t) + \Delta P_{shifting}^{i}(t)] - \sum_{j=1}^{N2} \Delta P_{2clipping}^{j}(t)$$

By using the two continuous variables $\lambda_1, \lambda_2$ and the two binary variables to represent the function, the EENS(t) can be represented as follows:

$$EENS(t) = \lambda_2 a_2 \quad \text{(Equation 17)}$$

$$X(t) = \Delta P_{gap}(t) - \sum_{i=1}^{N1} [\Delta P_{clipping}^{i}(t) + \Delta P_{shifting}^{i}(t)] -$$

$$\sum_{j=1}^{N2} \Delta P_{2clipping}^{j}(t) = \lambda_1 a_1 + \lambda_2 a_2$$

wherein $\lambda_1 \geq 0$ and $\lambda_2 \geq 0$;

$\lambda_1 \leq x_1$ and $\lambda_2 \leq x_2$;

$x_1 + x_2 = 1$;

$x_1 \in \{0,1\}$ $x_2 \in \{0,1\}$; and $a_1$ is a large enough negative number, while $a_2$ is a large enough positive number.

By means of linearization, it is easier to find the global solution. However, it should be appreciated that the linearization for the optimization model is only to help to search the global optimal solution and it does not change the optimization model. Additionally, it is easily appreciated that the present disclosure is not limited to the linearization and the skilled in the art can use any other means to facilitate the searching of the global optimal solution, such as by genetic algorithms, iterative algorithm and etc.

In such a way, it can obtain an optimal solution and the recommended load shaving strategy for each of the customers can be determined. That is to say, by solving the optimal problem, it can provide a detailed recommendation for each customer about which load shaving strategy it should take and how much to clip or shift. Therefore, with embodiments of the present disclosure, it provides a recommended load shaving strategy for each of power customers, which is consistent with the behavior characteristic customers and at the same time it can achieve optimization objective. Accordingly, the present disclosure has provided a critical solution especially for load shaving in utilities with serious supply shortage or significant peak-valley load difference. Besides, asset usage, and ROI may be improved and the supply pressure can be alleviated.

Figure 4:
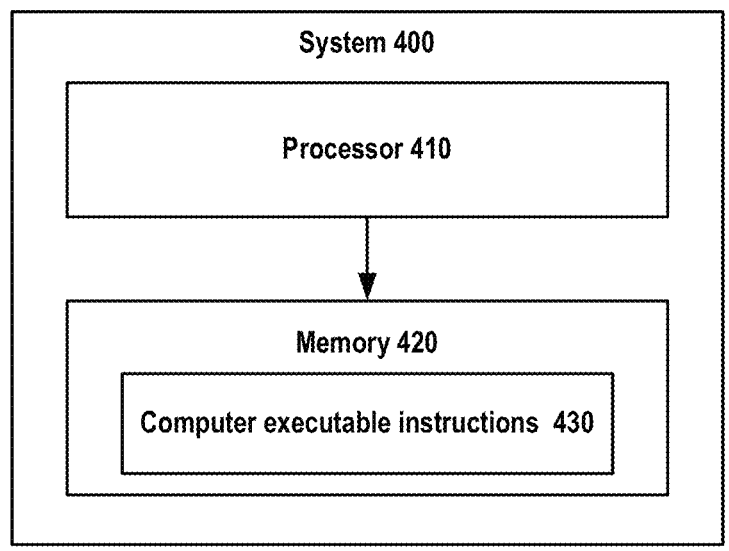
FIG. 4 schematically illustrates a diagram of a system for load shaving of a power grid according to an example embodiment of the present disclosure.

Additionally, there is also provided an apparatus which will be described with reference to FIG. 4. As illustrated in FIG. 4, system 400 for load shaving of a power grid can comprise at least one processor 410; and at least one memory 420 storing computer executable instructions 430. The at least one memory 420 and computer executable instructions 430 configured to, with the at least one processor 410, cause the system to: profile behavior data for power customers to divide the power customers into at least one group; define, based on usage characteristic of each of the at least one group, a possible load shaving strategy for each of the at least one group; and perform load shaving analysis at least under constraint of the possible load shaving strategy for each of the at least one group, to provide a recommended load shaving strategy for each of the power customers.

In an embodiment of the present disclosure, the profiling behavior data for power customers may comprise: analyzing the behavior data for the power customers to obtain customer load profiles and representative load curves; and dividing the power customers into at least one group based on the customer load profiles and the representative load curves.

In another embodiment of the present disclosure, the behavior data for power customers may comprise time series data. The time series data may further comprise one or more of load curves and energy consumption amount during each time interval. In a preferable embodiment of the present disclosure, the customers are large customers.

In a further embodiment of the present disclosure, the possible load shaving strategy for each of the at least one group may comprise: load shifting; load clipping; load shifting and load clipping; or not involving load shaving.

In a still further embodiment of the present disclosure, the defining a possible load shaving strategy for each of the at least one group may comprise: determining a peak-valley ratio for each of the at least one group; determining a correlation coefficient between a load curve for each of the at least one group and a system load curve; and determining the possible load shaving strategy for each of the at least one group based on at least the peak-valley ratio and the correlation coefficient.

In a yet further embodiment of the present disclosure, the determining the possible load shaving strategy for each of the at least one group may comprise determining the possible load shaving strategy as load clipping if the correlation coefficient is more than or equal to a predefined value and the peak-valley ratio is lower than a first predefined threshold; determining the possible load shaving strategy as both load clipping and load shifting if the correlation coefficient is more than or equal to the predefined value and the peak-valley ratio is higher than or equal to the first predefined threshold; determining the possible load shaving strategy as not involving the load shaving if the correlation coefficient is less than the predefined value and the peak-valley ratio is higher than a second predefined threshold; and determining the possible load shaving strategy as load clipping if the correlation coefficient is less than the predefined value and the peak-valley ratio is lower than or equal to the second predefined threshold.

In a still yet further embodiment of the present disclosure, the system 400 may be further configured to: check the supply priority of the customers; and determine the possible load shaving strategy as not involving the load shaving if the supply priority of a customer is high or it is a public service customer.

In another embodiment of the present disclosure, the performing load shaving analysis may comprise: performing the load shaving analysis under the constraint of the possible load shaving strategy for each of the at least one group with one or more objectives of an economic operation, a supply reliability and a customer satisfaction.

In a further embodiment of the present disclosure, a cost of the economic operation may be represented as $$COST_I = \sum_{i=1}^{N1} \sum_{t=1}^{T} C_i(t)[\Delta P_{clipping}^i(t) + \Delta P_{shifting}^i(t)] + \sum_{j=1}^{N2} \sum_{t=1}^{T} C_j \Delta P_{2clipping}^j(t)$$

wherein $COST_I$ denotes the revenue loss for the utility after taking the load shaving strategy; $N_1$ denotes the number of customers who could participate either in load clipping or load shifting; $N_2$ denotes the number of customers who could participate only in load clipping; i denotes an index of the customers in the $N_1$ customers; j denotes an index of the customers in the $N_2$ customers; t denotes an index of time intervals; T denotes the number of time intervals; $C_i(t)$ denotes power tariff of the ith customer in the $N_1$ customers at time interval t; $C_j(t)$ denotes power tariff of the jth customer in the $N_2$ customers at time interval t; $\Delta P_{clipping}^i(t)$ denotes clipped power of the ith customer in the $N_1$ customers at time interval t; $\Delta P_{shifting}^i(t)$ denotes shifted power of the ith customer in the $N_1$ customers at time interval t; and $\Delta P_{2clipping}^j(t)$ denotes clipped power of the jth customer in the $N_2$ customers at time interval t.

In a still further embodiment of the present disclosure, a cost of the supply reliability may be represented as $$COST_{II} = \sum_{t=0}^{T} K_{IEAR}(t) \cdot EENS(t)$$

wherein $COST_{II}$ denotes the outage loss for the utility when power supply could not match the demand; $K_{IEAR}(t)$ denotes Interrupted Energy Assessment Rate at time interval t; and EENS(t) denotes Expected Energy Not Supplied at time interval t, which is the difference between supply power and demand power at time interval t and can be represented as $$EENS(t) = \begin{cases} X(t), & X(t) \geq 0 \\ 0, & X(t) < 0 \end{cases}$$

$$X(t) = \Delta P_{gap}(t) - \sum_{i=1}^{N1} [\Delta P_{clipping}^i(t) + \Delta P_{shifting}^i(t)] - \sum_{j=1}^{N2} \Delta P_{2clipping}^j(t)$$

wherein $\Delta P_{gap}(t)$ wherein $\Delta P_{gap}(t)$ denotes the amount of power shortage of the total distribution system at each time interval t.

In a yet further embodiment of the present disclosure, the customer satisfaction objective may be represented as $$CosT_{III} = \sum_{i=1}^{N1} C_s^i(1 - S_i) + \sum_{j=1}^{N2} C_s^j(1 - S_j)$$

$$S_i = 1 - \frac{\sum_{t=1}^{T} \Delta P_{clippling}^i(t)}{\sum_{t=1}^{T} P^i(t)},$$

$$S_j = 1 - \frac{\sum_{t=1}^{T} \Delta P_{clippling}^j(t)}{\sum_{t=1}^{T} P^j(t)}$$

wherein $COST_{III}$ is the compensation fee paid by the utility for customer satisfaction reduction; $S_i$ is the satisfaction rate of the ith customer in the $N_1$ customers after taking load shaving strategy; $S_j$ is the satisfaction rate of the jth customer in the $N_2$ customers after taking load shaving strategy; $C_s^i$ is the compensation tariff for the ith customer in the $N_1$ customers; $C_s^j$ is the compensation tariff for jth customer in the $N_2$ customers; and $P^i(t)$ denotes original power of the ith customer in the $N_1$ customers at time interval t; and $P^j(t)$ denotes original power of the jth customer in the $N_2$ customers at time interval t.

In a still yet further embodiment of the present disclosure, the load shaving analysis may be further constrained to one or more of: a customer enrolling in only one load shaving strategy; loads to be clipped at a time interval not exceeding a maximum load change rate; loads to be shifted being equal to the difference between load values after shifting and before shifting; loads after optimization being between a minimum load and a maximum load; daily power consumption for each customer participating in load clipping could not increase; load of peak period for the whole power system could not be increased and load of valley period could not be decreased; and increased load amount at each time interval for the system load should be less than the spinning reserve of the whole system that could afford.

Figure 5:
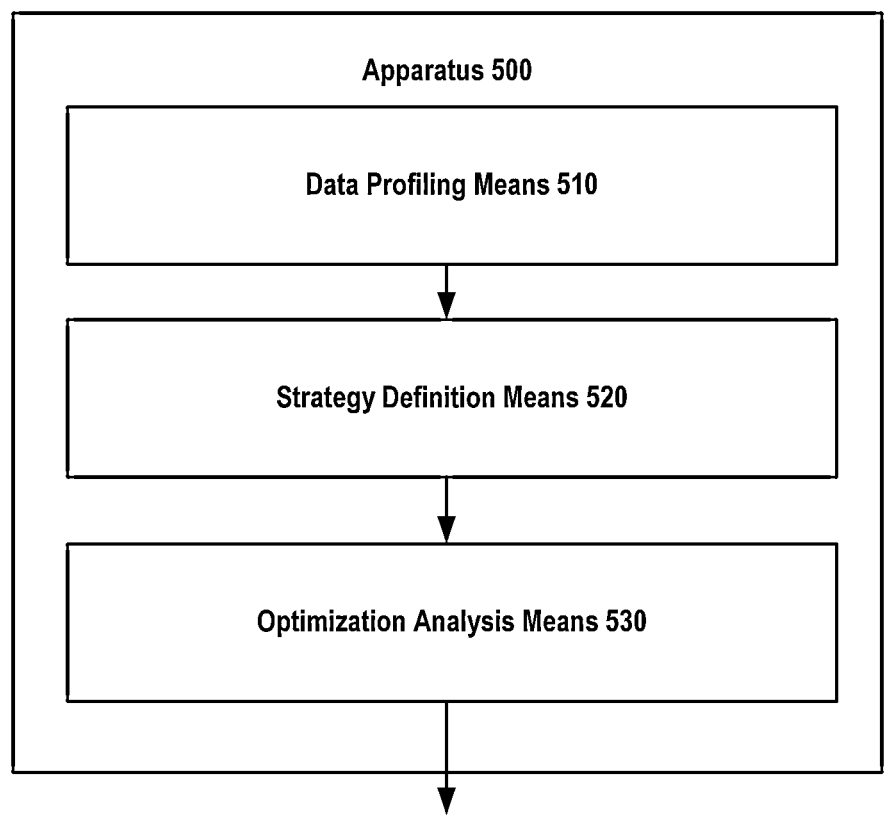
FIG. 5 schematically illustrates a diagram of an apparatus for load shaving of a power grid according to an example embodiment of the present disclosure.

Besides, there is provided an apparatus for load shaving of a power grid. As illustrated in FIG. 5, apparatus 500 may comprise means 510 for profiling behavior data for power customers to divide the power customers into at least one group; means 520 for defining, based on the usage characteristic of each of the at least one group, a possible load shaving strategy for each of the at least one group; and means 530 for performing load shaving analysis at least under constraint of the possible load shaving strategy for each of the at least one group, to provide a recommended load shaving strategy for each of the power customers.

Figure 6:
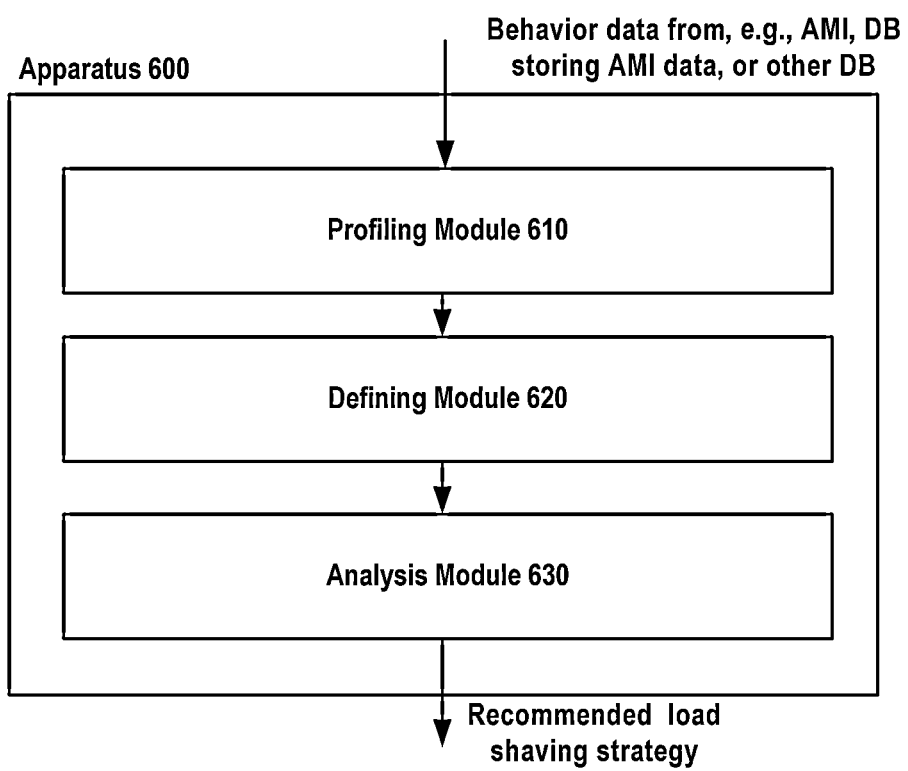
FIG. 6 schematically illustrates a diagram of an apparatus for load shaving of a power grid according to another example embodiment of the present disclosure.

Besides, there is provided another apparatus for load shaving of a power grid. FIG. 6 schematically illustrates a block diagram of apparatus for load shaving of a power grid according to an example embodiment of the present disclosure. As illustrated in FIG. 6, Apparatus 600 may comprise profiling module 610, defining module 620 and analysis module 630. The profiling module 610 may be configured to profile behavior data for power customers to divide the power customers into at least one group. The defining module 620 may be configured to define, based on the usage characteristic of each of the at least one group, a possible load shaving strategy for each of the at least one group. The analysis module 630 may be configured to perform load shaving analysis at least under constraint of the possible load shaving strategy for each of the at least one group, to provide a recommended load shaving strategy for each of the power customers.

Furthermore, there is provided a tangible computer-readable medium having a plurality of instructions executable by a processor to manage loads of a power grid, the tangible computer-readable medium comprises instructions configured to perform steps of the method according to any embodiments of method of the present disclosure.

It should be noted that operations of respective units as comprised in the system 400, apparatus 500, apparatus 600 substantially correspond to respective method steps as previously described. Therefore, for detailed operations of respective units in the system 400, apparatus 500 and apparatus 600, please refer to the previous descriptions of the methods of the present disclosure with reference to FIGS. 2 to 3D.

Figure 7:
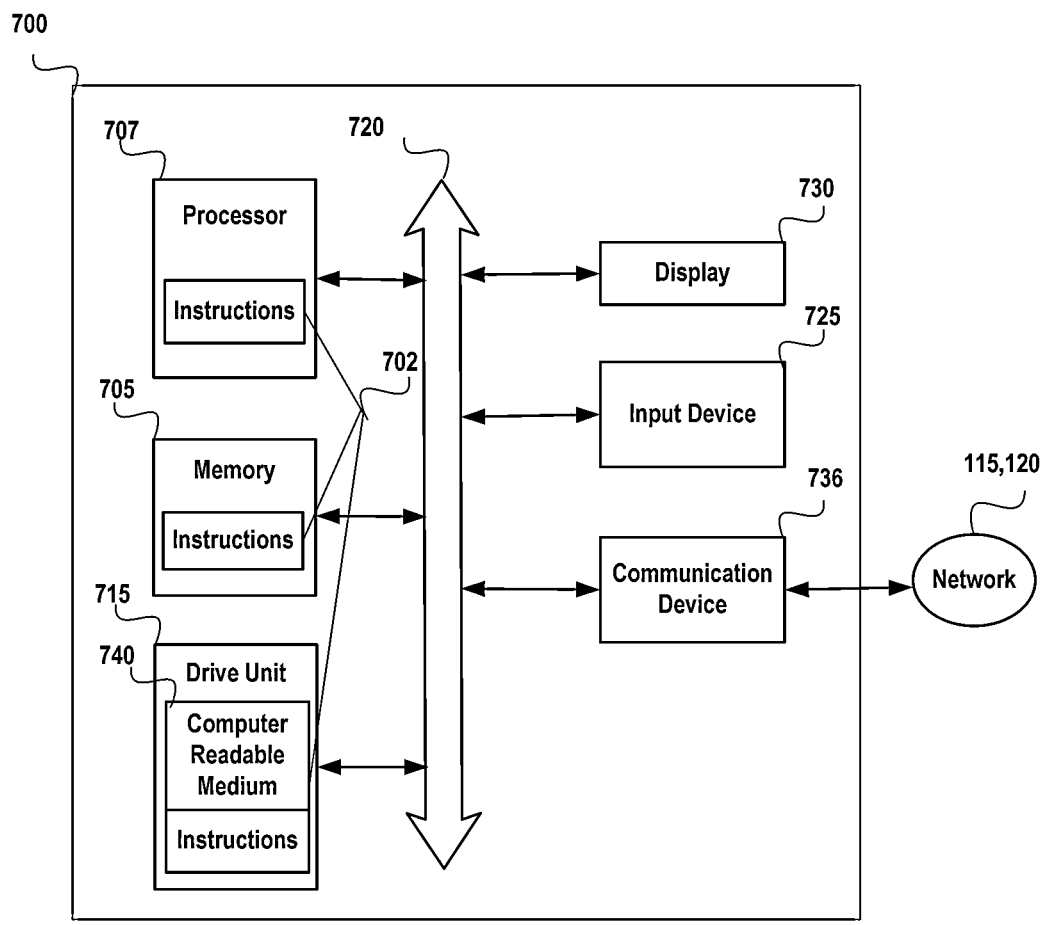
FIG. 7 schematically a general computer system, programmable to be a specific computer system, which may represent any of the computing devices referenced herein.

FIG. 7 is a general computer system 700, which may represent any of the computing devices referenced herein. For instance, the general computer system 700 may represent—in part or in its entirety—the control center, the head end, the integrated network operations and management system (NOMS), the fault, performance, and configuration management (FPCM) module, or any other computing devices referenced herein such as the end devices, the meters, the telemetry interface units (TIUs), the collectors, and/or any networked components such as routers, switches or servers as discussed herein. The computer system 700 may include an ordered listing of a set of instructions 702 that may be executed to cause the computer system 700 to perform any one or more of the methods or computer-based functions disclosed herein. The computer system 700 may operate as a stand-alone device or may be connected, e.g., using the network 115, 120, to other computer systems or peripheral devices.

In a networked deployment, the computer system 700 may operate in the capacity of a server or as a client-user computer in a server-client user network environment, or as a peer computer system in a peer-to-peer (or distributed) network environment. The computer system 700 may also be implemented as or incorporated into various devices, such as a personal computer or a mobile computing device capable of executing a set of instructions 702 that specify actions to be taken by that machine, including and not limited to, accessing the network 115, 120 through any form of browser. Further, each of the systems described may include any collection of sub-systems that individually or jointly execute a set, or multiple sets, of instructions to perform one or more computer functions.

The computer system 700 may include a processor 707, such as a central processing unit (CPU) and/or a graphics processing unit (GPU). The processor 707 may include one or more general processors, digital signal processors, application specific integrated circuits, field programmable gate arrays, digital circuits, optical circuits, analog circuits, combinations thereof, or other now known or later-developed devices for analyzing and processing data. The processor 707 may implement the set of instructions 702 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility with computer processing or networked communication.

The computer system 700 may include a memory 705 on a bus 720 for communicating information. Code operable to cause the computer system to perform any of the acts or operations described herein may be stored in the memory 705. The memory 705 may be a random-access memory, read-only memory, programmable memory, hard disk drive or any other type of volatile or non-volatile memory or storage device.

The computer system 700 may also include a disk, solid-state drive optical drive unit 715. The disk drive unit 715 may include a non-transitory or tangible computer-readable medium 740 in which one or more sets of instructions 702, e.g., software, can be embedded. Further, the instructions 702 may perform one or more of the operations as described herein. The instructions 702 may reside completely, or at least partially, within the memory 705 and/or within the processor 707 during execution by the computer system 700. The database or any other databases described above may be stored in the memory 705 and/or the disk unit 715.

The memory 705 and the processor 707 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 700 may include an input device 725, such as a keyboard or mouse, configured for a user to interact with any of the components of system 700, including user selections or menu entries of display menus. It may further include a display 730, such as a liquid crystal display (LCD), a cathode ray tube (CRT), or any other display suitable for conveying information. The display 730 may act as an interface for the user to see the functioning of the processor 707, or specifically as an interface with the software stored in the memory 705 or the drive unit 715.

The computer system 700 may include a communication interface 736 that enables communications via the communications network 120. The network 120 may include wired networks, wireless networks, or combinations thereof. The communication interface 736 network may enable communications via any number of communication standards, such as Ethernet AVB, 802.11, 802.17, 802.20, WiMax, or other communication standards.

Accordingly, the system may be realized in hardware, software, or a combination of hardware and software. The system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

As described herein, any modules or processing boxes are defined to include software, hardware or some combination thereof executable by the processor 707. Software modules may include instructions stored in the memory 705, or other memory device, that are executable by the processor 707 or other processors. Hardware modules may include various devices, components, circuits, gates, circuit boards, and the like that are executable, directed, and/or controlled for performance by the processor 707.

The system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

By far, the present disclosure has been described with reference to the accompanying drawings through particular preferred embodiments. However, it should be noted that the present disclosure is not limited to the illustrated and provided particular embodiments, but various modification may be made within the scope of the present disclosure.

Further, the embodiments of the present disclosure can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example, a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example, by firmware.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

What is claimed is:

1. A system for load shaving of a power grid, comprising:
at least one memory storing computer executable instructions;
at least one processor configured to be in communication with the memory; and
wherein the at least one processor executes the computer executable instructions, causing the system to:
form customer load profiles from behavior data of a plurality of power customers;
divide the power customers into a plurality of respective groups based on a comparison of the customer load profiles;
generate a load profile for each of the respective groups;
determine a respective peak-valley ratio for the load profile of each of the respective groups;
determine a respective correlation coefficient between the load profile for each of the respective groups and a system load profile for all the groups;
generate, based on the respective peak-valley ratio and the respective correlation coefficient of each of the respective groups, a plurality of respective load shaving strategies for each of the respective groups;

select, based on an optimization objective, a load shaving strategy for a power customer in one of the respective groups from the generated respective load shaving strategies for that respective group; and generate load shaving for the power grid based on the selected load shaving strategy.

2. The system of claim 1, wherein the behavior data for power customers comprise time series data.

3. The system of claim 2, wherein the time series data comprise one or more of load curves and energy consumption amount during each time interval.

4. The system of claim 1, wherein a peak demand of the power customers is at least 50 KVA.

5. The system of claim 1, wherein at least one of the respective load shaving strategies comprises at least one of load shifting or load clipping.

6. The system of claim 1, wherein executing the computer executable instructions causes the system to generate the load shaving strategies for each of the respective groups by:

determining one of the load shaving strategies as load clipping if the respective correlation coefficient is more than or equal to a predefined value and the respective peak-valley ratio is lower than a first predefined threshold;

determining one of the load shaving strategies as both load clipping and load shifting if the respective correlation coefficient is more than or equal to the predefined value and the respective peak-valley ratio is higher than or equal to the first predefined threshold;

determining one of the load shaving strategies as not involving load shaving if the respective correlation coefficient is less than the predefined value and the respective peak-valley ratio is higher than a second predefined threshold; and determining one of the load shaving strategies as load clipping if the respective correlation coefficient is less than the predefined value and the respective peak-valley ratio is lower than or equal to the second predefined threshold.

7. The system of claim 6, wherein executing the computer executable instructions further causes the system to:

check supply priority of the power customers; and the optimization objective includes an avoidance of load shaving for either power customers with a high supply priority or power customers who are public service customers.

8. The system of claim 1, wherein the optimization objective is based on at least one of a supply reliability or a customer satisfaction.

9. The system of claim 1, wherein the optimization objective includes an accommodation of at least one constraint to selection of the load shaving strategy from a group of constraints consisting of:

a customer enrolling in only one load shaving strategy;

loads to be clipped at a time interval not exceeding a maximum load change rate;

loads to be shifted being equal to the difference between load values after shifting and before shifting;

loads after optimization being between a minimum load and a maximum load;

no increase in daily power consumption for each customer participating in load clipping;

no increase in load of peak period for the whole power system and no decrease in load of valley period; and increased load amount at each time interval for the system load of less than the spinning reserve of the whole system.

10. The system of claim 1, wherein at least one of the load shaving strategies does not involve load shaving.

11. The system of claim 1, wherein the comparison of the customer load profiles comprises the at least one processor executing the computer executable instructions to compare respective load curves of each of the customer load profiles.

12. The system of claim 1, wherein the computer executable instruction causing the system to divide the power customers into the plurality of respective groups further cause the system to form the respective groups based on a predetermined type of each of the customer load profiles, wherein the predetermined type of each of the customer load profiles comprises a reverse type, a smooth type, and a volatile type.

13. A method of load shaving of a power grid, the method comprising:

forming, using a processor, customer load profiles from behavior data of a plurality of power customers;

dividing, using the processor, the power customers into a plurality of respective groups based on a comparison of the customer load profiles;

generating, using the processor, a respective load profile of each of the respective groups;

determining, using the processor, a respective peak-valley ratio for each of the respective groups;

determining, using the processor, a respective correlation coefficient between the respective load profile of each of the respective groups and a system load profile of all the respective groups;

generating using the processor, a plurality of respective load shaving strategies for each of the respective groups, each of the plurality of respective load shaving strategies based on the respective peak-valley ratio and the respective correlation coefficient of each of the respective groups;

selecting, using the processor, a load shaving strategy for a power customer in one of the respective groups from the generated respective load shaving strategies for that respective group, wherein the respective load shaving strategy is selected based on an optimization objective; and generating, using the processor, load shaving for the power grid based on the selected load shaving strategy.

14. The method of claim 13, wherein the behavior data for power customers comprise time series data.

15. The method of claim 14, wherein the time series data comprise one or more of load curves and energy consumption amount during each time interval.

16. The method of claim 13, wherein a peak demand of the power customers is at least 50 KVA.

17. The method of claim 13, wherein at least one of the load shaving strategies comprises load shifting and load clipping.

18. The method of claim 13, wherein generating the load shaving strategies for each of the respective groups comprises:

determining one of the load shaving strategies as load clipping if the respective correlation coefficient is more than or equal to a predefined value and the respective peak-valley ratio is lower than a first predefined threshold;

determining one of the load shaving strategies as both load clipping and load shifting if the respective correlation coefficient is more than or equal to the predefined value and the respective peak-valley ratio is higher than or equal to the first predefined threshold;

determining one of the load shaving strategies as not involving load shaving if the respective correlation coefficient is less than the predefined value and the respective peak-valley ratio is higher than a second predefined threshold; and determining one of the load shaving strategies as load clipping if the respective correlation coefficient is less than the predefined value and the respective peak-valley ratio is lower than or equal to the second predefined threshold.

19. The method of claim 18, wherein the optimization objective includes not involving the load shaving if either a supply priority of a the power customer is high or the power customer is a public service customer.

20. The method of claim 13, wherein:

the optimization objective includes at least one objective based on a supply reliability, and a customer satisfaction.

21. The method of claim 20, wherein the optimization objective includes an accommodation of at least one constraint to selecting the load shaving strategy from a group of constraints consisting of:

a customer enrolling in only one load shaving strategy;

loads to be clipped at a time interval not exceeding a maximum load change rate;

loads to be shifted being equal to a difference between load values after shifting and before shifting; and loads after optimization being between a minimum load and a maximum load;

daily power consumption not increasing for each customer participating in load clipping;

load of peak period for the whole power system not increasing and load of valley period for the whole power system not decreasing; and increased load amount at each time interval for the system load not being less than a spinning reserve of the whole system.

22. A tangible computer-readable medium storing a plurality of instructions executable by a processor to manage a load of a power grid, wherein a processor is configured to execute the instructions to perform the steps of the method of claim 13.

23. The method of claim 13, wherein at least one of the load shaving strategies does not involve load shaving.

24. The method of claim 13, wherein the comparison of the customer load profiles comprises comparing respective load curves of each of the customer load profiles.

25. The method of claim 13, wherein dividing, using the processor, the power customers into the plurality of respective groups further comprises the step of forming, using the processor, the respective groups based on a predetermined type of each of the customer load profiles, wherein the predetermined type of each of the customer load profiles comprises a reverse type, a smooth type, and a volatile type.

26. The method of claim 25 wherein each of the plurality of respective load shaving strategies is further based on a predetermined type of the respective load profile of each of the respective groups, wherein the predetermined type of the respective load profile of each of the respective groups comprises a reverse type, a smooth type, and a volatile type.

27. An apparatus for load shaving of a power grid, the apparatus comprising:

circuitry to form customer load profiles from behavior data of a plurality of power customers;

circuitry to divide the power customers into a plurality of respective groups based on a comparison of the customer load profiles;

circuitry to generate a respective load profile for each of the respective groups;

circuitry to determine a respective peak-valley ratio for each of the respective groups;

circuitry to determine a respective correlation coefficient between the respective load profile for each of the respective groups and a system load profile for all the groups;

circuitry to generate, based on the respective peak-valley ratio and the respective correlation coefficient of each of the respective groups, a plurality of respective load shaving strategies for each of the respective groups;

circuitry to select, based on an optimization objective, a load shaving strategy for a power customer in one of the respective groups from the generated respective load shaving strategies for that respective group; and circuitry to generate load shaving for the power grid based on the selected load shaving strategy.

28. The apparatus of claim 27, wherein at least one of the load shaving strategies does not involve load shaving.

29. The apparatus of claim 27, wherein the comparison of the customer load profiles comprises comparison of a respective load curve of each of the customer load profiles.

30. The apparatus of claim 27, wherein the circuitry to divide the power customers into the plurality of respective groups further comprises circuitry to form the respective groups based on a predetermined type of each of the customer load profiles, wherein the predetermined type of each of the customer load profiles comprises a reverse type, a smooth type, and a volatile type.

* * * * *